United States Patent

Hou

[11] Patent Number: 6,049,275
[45] Date of Patent: Apr. 11, 2000

[54] SECURITY MECHANISM FOR AN IC PACKING BOX

[76] Inventor: Chien Tzu Hou, 38881 Garibald Common, Fremont, Calif. 94536

[21] Appl. No.: 09/333,288

[22] Filed: Jun. 15, 1999

[51] Int. Cl.[7] .................................................. G08B 13/00
[52] U.S. Cl. ........................................... 340/541; 361/803
[58] Field of Search .................................... 340/541, 687, 340/693.5, 693.9; 361/748, 760, 784, 785, 803; 324/73.1, 76.11

[56] References Cited

U.S. PATENT DOCUMENTS

| | | | |
|---|---|---|---|
| 3,833,853 | 9/1974 | Milford | 324/73 |
| 5,608,262 | 3/1997 | Degani et al. | 257/723 |
| 5,646,828 | 7/1997 | Degani et al. | 361/715 |
| 5,699,235 | 12/1997 | Tsurumiya et al. | 361/803 |

*Primary Examiner*—Edward Lefkowitz
*Attorney, Agent, or Firm*—Rosenberg, Klein & Lee

[57] ABSTRACT

A security mechanism for an IC packing box includes a plurality of detecting circuit boards in the packing box. These circuit boards are arranged by pairs. The upper circuit board has etched vertical wiring, and the lower circuit board has etched horizontal wiring. The vertical wiring and the horizontal wiring are connected through zero-ohm resistors for forming a crossing security net. The security net has a plug to connect with a socket slot of an IC circuit board. At least one detecting lead of the IC can send random signals to the detecting circuit boards for completing an electric loop. Foreign invasion upon the packing box is determined by evaluating the flow of the electric loop.

7 Claims, 4 Drawing Sheets

6,049,275

SECURITY MECHANISM FOR AN IC PACKING BOX

BACKGROUND OF THE INVENTION (1) Field of the Invention

The invention relates to a security mechanism for an IC packing box, and more particularly to a shielding mechanism of a box in which can provide protection from foreign invasion so as to ensure the safety of IC's located therein-side.

(2) Description of the Prior Art

On design of electronics and circuiting, full-scale programs or software are usually coded into a unique IC (integrated circuit) for forming a single-chip control element. Generally, the programs or software are organized by a programmable code or a machine code for the reason that the code is hard to read and then the IC can be protected from piracy. To achieve the protection purpose, a simple and less-cost method is to construct a packing box to shield the IC. By providing a sealed packing box, the IC inside can then be protected from possible or intended piracy on the built-in programmable code. Thus, the design of the IC can be safely kept.

Nevertheless, the packing box is usually constructed as a simple box. So, any conventional method, such as drilling and knocking, can be used to break in the box without damaging the IC and thus make the programmable code inevitably accessible to unexpected people. Obviously, the simple packing box is not qualified in view of security. Therefore, for avoiding any damage from foreign party, security protection upon the packing box is necessary.

SUMMARY OF THE INVENTION

Accordingly, it is an object of the present invention to provide a security mechanism for an IC packing box, in which a plurality of detecting circuit boards are provided. The detecting circuit boards are arranged by pairs, and each pair of detecting boards further includes an upper circuit board with etched vertical wiring and a lower circuit board with etched horizontal wiring. Zero-ohm resistors are used to interconnect the etched vertical wiring and the etched horizontal wiring for forming a crossing security net. The security mechanism also provides a plug for connecting with a socket slot of an IC circuit board located inside the packing box. The IC generates a random signal for the security net through one detecting lead of the IC. By evaluating the electric loop status of the detecting boards, the completeness of the packing box can then be determined.

It is yet another object of the present invention to provide a security mechanism for an IC packing box, in which an all-time security function can be provided to the packing box, even at the down time of the packing box, by simply supplying electricity to the IC for continuously generating detecting signals to avoid any possible invasion.

It is a further object of the present invention to provide a security mechanism for an IC packing box, which the IC can automatically lock the built-in programmable code at the moment of detecting an invasion, for avoiding any unexpected piracy.

It is one more object of the present invention to provide a security mechanism for an IC packing box, in which the detecting circuit board can be used to form a more intense security net. The intense security net can include at least a pair of detecting wiring for providing more accurate detecting coverage even at the very corner of the packing box.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a security mechanism for an IC packing box. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
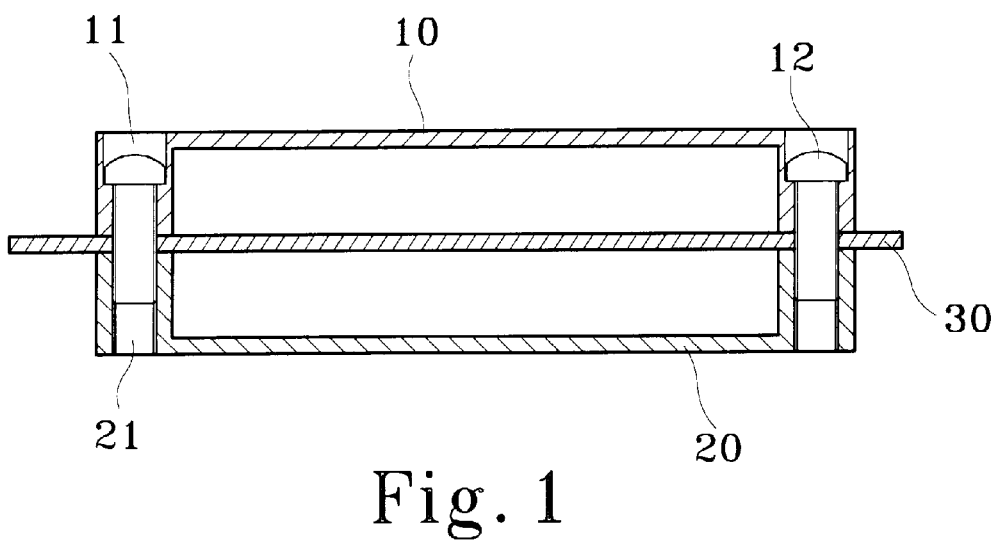
FIG. 1 is a cross-sectional view of a packing material and an engaged IC circuit board in accordance with the present invention.

Referring now to FIG. 1, a cross-sectional view of a packing material and an IC circuit board according to the present invention is shown. The packing material for sealing an IC element 31 on the IC circuit board 30 includes an upper case 10 and a lower case 20, to be assembled onto an upper and a lower surfaces of the IC circuit board 30, respectively. The packing material is integrated via screws 12 to be anchored inside screw holes 11 and 21, respectively, on the upper and the lower cases 10 and 20.

Figure 2:
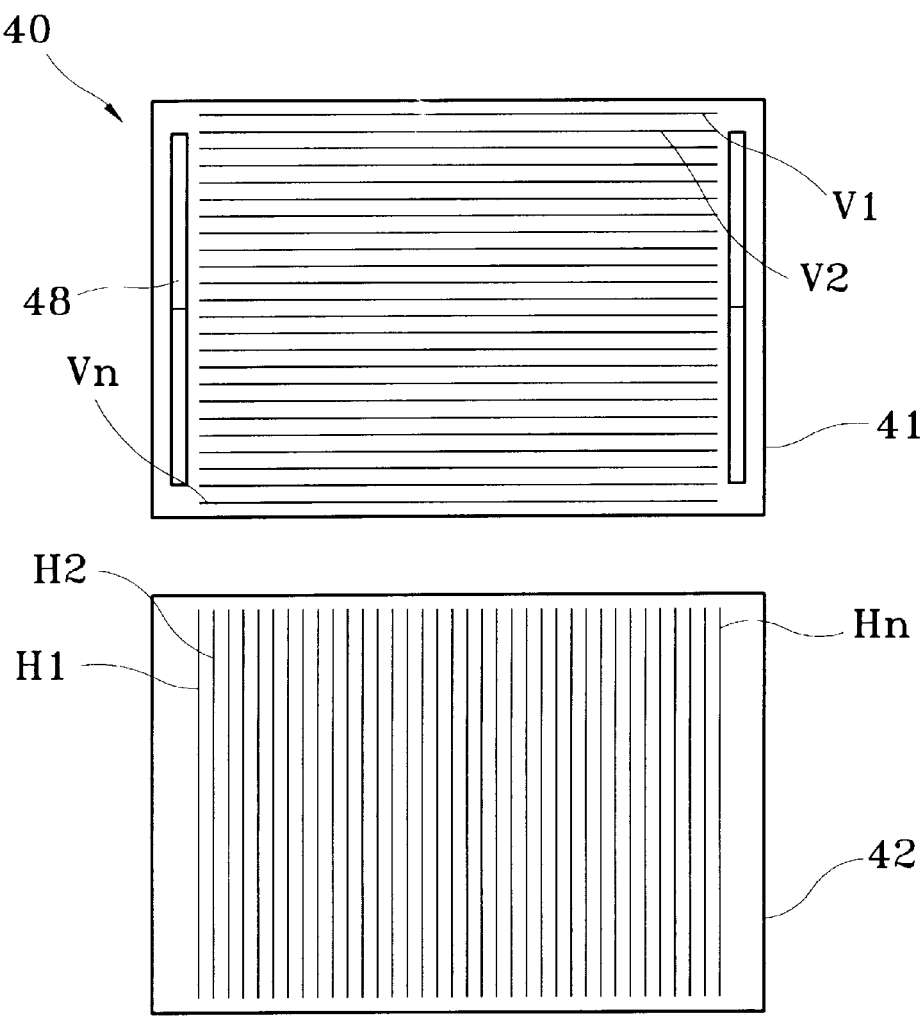
FIG. 2 is a schematic view of a first embodiment of detecting circuit boards in accordance with the present invention.
Figure 3:
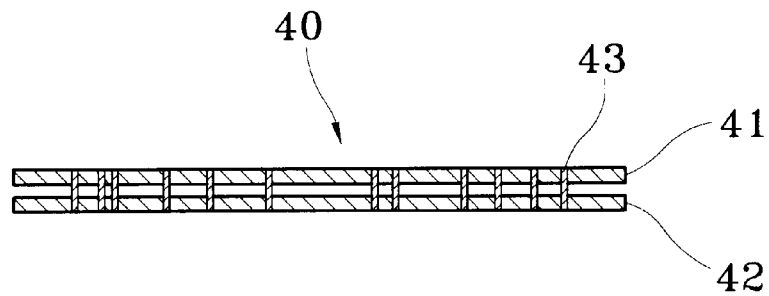
FIG. 3 is a cross-sectional view of the first embodiment of FIG. 2.

Referring now to FIG. 2 and FIG. 3, a first embodiment of the detecting circuit board in accordance with the present invention is shown. The present invention includes a plurality of detecting circuit boards 40 located at the facing sides of the upper case 10 and the lower case 20, in which the detecting circuit boards 40 are arranged by pairs. The upper circuit board 41 has etched vertical wiring, and the lower circuit board 42 has etched horizontal wiring (i.e. to cross with the vertical wiring of the upper circuit board 41). Drill holes on both the upper circuit board 41 and the lower circuit board 42 are provided to receive zero-ohm resistors 43 for electrically connecting the vertical wiring with the horizontal wiring, so as to form a crossing security net. For example shown in FIG. 2 and FIG. 3, the upper circuit board 41 can has a plurality of equal-spaced etched vertical lines ($V_1$, $V_2$, $V_3$, È), and the lower circuit board 42 can has a plurality of equal-spaced etched horizontal lines ($H_1$, $H_2$, $H_3$,È). The zero-ohm resistors 43 located close to both lateral sides of the circuit boards 41 and 42 are used to integrate the vertical lines (i.e. vertical wiring) and horizontal lines (i.e. horizontal wiring) for forming an electric-connected crossing security net.

Figure 4:
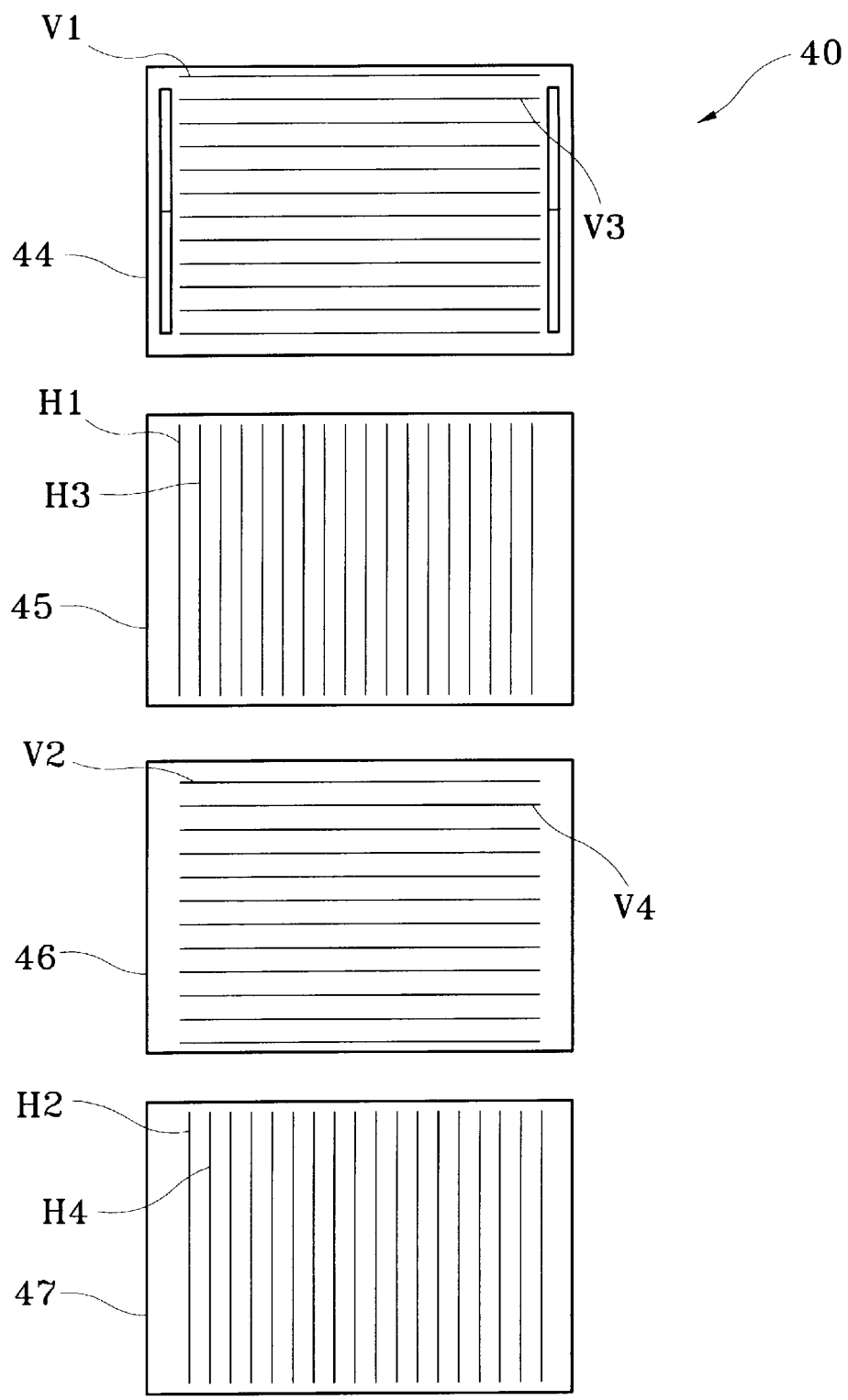
FIG. 4 is a schematic view of a second embodiment of detecting circuit boards in accordance with the present invention.

In order to provide security coverage over entire area of the packing material, aforesaid two layers of detecting circuit boards 41 and 42 need to be upgraded to a security mechanism with more pairs of layering detecting circuit boards. Following example with four layers of detecting circuit boards is shown in FIG. 4 to elucidate the upgraded security mechanism of the present invention.

As shown, a first detecting circuit board 44 can have an odd number of horizontal lines ($H_1$, $H_3$, $H_5$, $H_7$,È), a second detecting circuit board 45 can have an odd number of vertical lines ($V_1$, $V_3$, $V_5$, $V_7$,È), a third detecting circuit board 46 can have an even number of horizontal lines ($H_2$, $H_4$, $H_6$, $H_8$, È), and a fourth detecting circuit board 47 can have an even number of vertical lines ($V_2$, $V_4$, $V_6$, $V_8$,È). By overlapping the first, the second, the third, and the fourth detecting circuit boards 44, 45, 46, and 47, a more complicated crossing security net can be formed. Similarly, drill holes can be provided to the intersection points of the vertical and horizontal lines for receiving interconnected zero-ohm resistors 43. By such an arrangement, the line spacing in each layer can be extended, so that coverage of the security net can be enlarged as well. That is, almost entire upper and lower cases 10 and 20 can be protected by the security net.

Further, to prevent an invader from directly removing the screws 12, each screw 12 can also be arranged preferably to an intersection point 34 (FIG. 5) of the vertical wiring and the horizontal wiring and be deemed as another resistor in the net. By such an arrangement, any removing of the screws 12 can be detected as well. However, the position of the screw 12 can also be determined at a relevant location other than an intersection point of the vertical wiring and the horizontal wiring.

Figure 5:
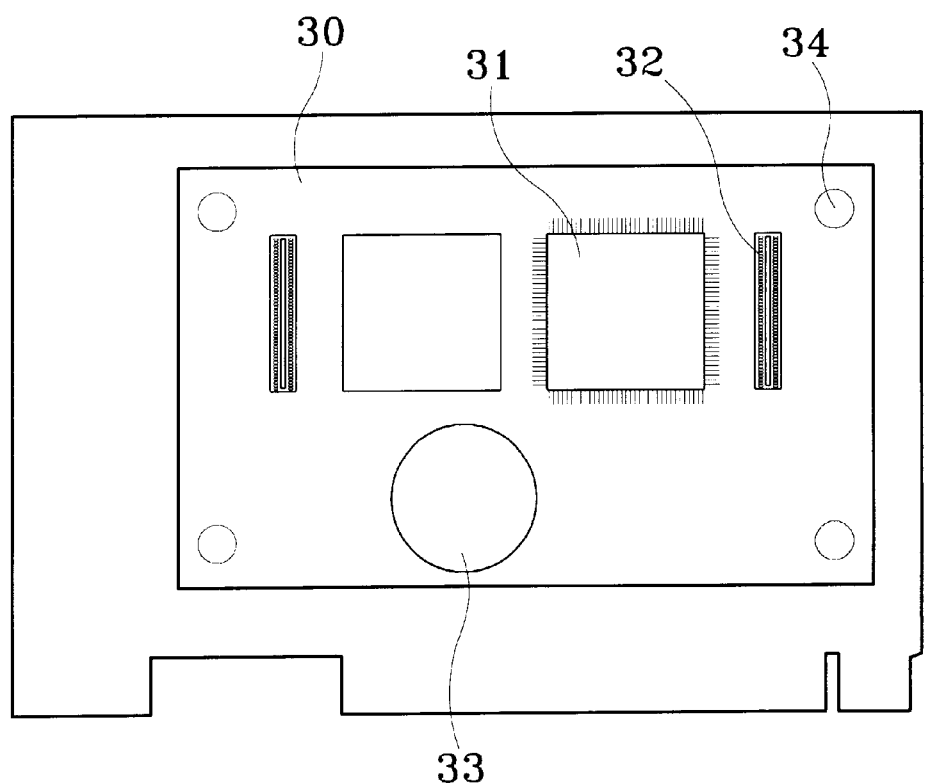
FIG. 5 is a bottom view of an IC circuit board in accordance with the present invention.

Referring now to FIG. 5, a bottom view of the IC circuit board is shown. At the common connection of the detecting circuit board 40, a plug 48 can be formed to integrate the wiring 9 as shown in FIG. 2). On the IC circuit board 30, a respective socket slot 32 can be formed to electrically connect with the plug 48, for forming a complete electric loop integrating the detecting circuit board 40 and the IC circuit board 30. The IC element 31 is software-controlled, and has at least a detecting lead for output a random signal. The signal of the lead can flow through the layering detecting circuit boards 40, via the plug 48 and the socket slot 32. In the case that the signal cannot complete the electric loop and flow back to the IC element 31, it thus indicates that somewhere in the detecting circuit boards 40 is open. That is, an unexpected invasion is introduced to the packing material/box. Then, the IC element 31 will react to lock the internal programmable code, so that no piracy on the code can be proceeded and the code can be safe in the current invasion.

In the present invention, the detecting lead can be a specific lead on the IC, or a relevant lead of the IC suitable to meet the synchronic application.

Further, in order to provide protection during the down time of the IC element 31, the IC circuit board 30 can include a battery 33 for all-time energizing the IC element 31 to generate the detecting signal for flowing through the detecting circuit boards 40.

While the present invention has been particularly shown and described with reference to preferred embodiments, it will be understood by those skilled in the art that various changes in form and detail may be without departing from the spirit and scope of the present invention.

I claim:

1. A security mechanism for an IC packing box, comprising:

at least a pair of layering detecting circuit boards, each pair further including a first detecting circuit board with etched vertical wiring, a second detecting circuit board with etched horizontal wiring, resistors interconnecting the etched vertical wiring with the etched horizontal wiring for forming an electric loop, and a plug common to the first and the second detecting circuit boards; and an IC circuit board, having thereon an IC element and a socket engageable with the plug, the IC element further having at least a lead connected with the socket for sending signals to examine if the electric loop is normal.

2. The security mechanism for an IC packing box according to claim 1, wherein said IC circuit board further has shielding packing material at both sides thereof.

3. The security mechanism for an IC packing box according to claim 2, wherein said packing material includes an upper case and a lower case.

4. The security mechanism for an IC packing box according to claim 1, wherein said layering detecting circuit boards are formed by a circuit board having thereon the etched vertical wiring at one side and the etched horizontal wiring at another side.

5. The security mechanism for an IC packing box according to claim 1, wherein said layering detecting circuit boards include a first circuit board with an odd-number etched vertical wiring, a second circuit board with an odd-number etched horizontal wiring, a third circuit board with an even-number etched vertical wiring, and a fourth circuit board with an even-number etched horizontal wiring.

6. The security mechanism for an IC packing box according to claim 1, wherein said IC circuit board further has a battery for supplying all-time electricity to the IC element.

7. The security mechanism for an IC packing box according to claim 1, wherein said resistors are zero-ohm resistors.

* * * * *